(12) United States Patent
Plouchart et al.

(10) Patent No.: US 11,587,890 B2
(45) Date of Patent: Feb. 21, 2023

(54) TAMPER-RESISTANT CIRCUIT, BACK-END OF THE LINE MEMORY AND PHYSICAL UNCLONABLE FUNCTION FOR SUPPLY CHAIN PROTECTION

(71) Applicant: International Business Machines Corporation, Armonk, NY (US)

(72) Inventors: Jean-Olivier Plouchart, New York, NY (US); Dirk Pfeiffer, Croton on Hudson, NY (US); Arvind Kumar, Chappaqua, NY (US); Takashi Ando, Eastchester, NY (US); Peilin Song, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/933,549

(22) Filed: Jul. 20, 2020

(65) Prior Publication Data
US 2022/0020706 A1    Jan. 20, 2022

(51) Int. Cl.
  *H01L 23/00* (2006.01)
  *G06F 21/78* (2013.01)
  *H04L 9/32* (2006.01)

(52) U.S. Cl.
  CPC ............ *H01L 23/573* (2013.01); *G06F 21/78* (2013.01); *H01L 23/57* (2013.01); *H04L 9/3278* (2013.01)

(58) Field of Classification Search
  CPC .................................................. H01L 23/573
  (Continued)

(56) References Cited

U.S. PATENT DOCUMENTS

| 5,369,299 A | 11/1994 | Byrne |
| 6,512,454 B2 | 1/2003 | Miglioli et al. |

(Continued)

FOREIGN PATENT DOCUMENTS

| EP | 2510475 | 10/2012 |
| WO | 2004021358 | 3/2004 |

(Continued)

OTHER PUBLICATIONS

Imeson, Frank, "Securing Computer Hardware Using 3D Integrated Circuit (IC) Technology and Split Manufacturing for Obfuscation" (paper and slide presentation). Proc. USENIX Security Symposium, University of Waterloo, Electrical and Computer Engineering Dept. (2013).

(Continued)

*Primary Examiner* — Ajay Arora
(74) *Attorney, Agent, or Firm* — Stephen J. Walder, Jr.; Jeffrey S. LaBaw

(57) ABSTRACT

A tamper-resistant memory is formed by placing a solid-state memory array between metal wiring layers in the upper portion of an integrated circuit (back-end of the line). The metal layers form a mesh array that surrounds the memory array to protect it from picosecond imaging circuit analysis, side channel attacks, and delayering with electrical measurement. Interconnections between a memory cell and its measurement circuit are designed to protect each layer below, i.e., an interconnecting metal portion in a particular metal layer is no smaller than the interconnecting metal portion in the next lower layer. The measurement circuits are shrouded by the metal mesh. The substrate, metal layers and memory array are part of a single monolithic structure. In an embodiment adapted for a chip identification protocol, the memory array contains a physical unclonable function iden- (Continued)

tifier that uniquely identifies the tamper-resistant integrated circuit, a symmetric encryption key and a release key.

20 Claims, 7 Drawing Sheets

(58) Field of Classification Search
USPC .......................................................... 257/922
See application file for complete search history.

(56) References Cited

U.S. PATENT DOCUMENTS

| | | |
|---|---|---|
| 7,734,043 B1 | 6/2010 | Jefferson et al. |
| 8,741,713 B2 | 6/2014 | Bruley et al. |
| 9,059,188 B1 | 6/2015 | Dimitrakopoulos et al. |
| 9,184,751 B2 | 11/2015 | Pfeiffer et al. |
| 2002/0099948 A1 | 7/2002 | Kocher et al. |
| 2004/0117744 A1 | 6/2004 | Nation et al. |
| 2006/0048223 A1 | 3/2006 | Lee et al. |
| 2007/0121575 A1 | 5/2007 | Savry et al. |
| 2010/0115260 A1 | 5/2010 | Venkatesan et al. |
| 2011/0031982 A1 | 2/2011 | Leon et al. |
| 2011/0227601 A1* | 9/2011 | Hashimoto ........ G01R 31/2886 324/762.02 |
| 2011/0227603 A1 | 9/2011 | Leon et al. |
| 2012/0185636 A1 | 7/2012 | Leon et al. |
| 2014/0042442 A1 | 2/2014 | Bruley et al. |
| 2014/0042627 A1 | 2/2014 | Edelstein et al. |
| 2014/0140513 A1 | 5/2014 | BrghtSky et al. |
| 2015/0071432 A1 | 3/2015 | Zhu et al. |
| 2016/0373264 A1 | 12/2016 | Katoh |
| 2018/0011959 A1* | 1/2018 | Irissou .................. H01L 23/573 |
| 2018/0060561 A1 | 3/2018 | Pederson |
| 2018/0373892 A1 | 12/2018 | Omer et al. |
| 2019/0129892 A1 | 5/2019 | Sinanoglu et al. |
| 2019/0190725 A1 | 6/2019 | De et al. |
| 2019/0258766 A1 | 8/2019 | Wang et al. |
| 2019/0311156 A1* | 10/2019 | Tehranipoor .......... G06F 30/394 |

FOREIGN PATENT DOCUMENTS

| | | |
|---|---|---|
| WO | 2006052935 | 5/2006 |
| WO | 2018009415 | 1/2018 |

OTHER PUBLICATIONS

Wikipedia, "Side-channel attack" [online], retrieved on Jun. 11, 2020 from the Internet URL: https://en.wikipedia.org/wiki/Side-channel_attack (2020).

International Search Report and Written Opinion dated Oct. 20, 2021 for International Application No. PCT/CN2021/106504, 10 pages.

International Search Report and Written Opinion dated Oct. 15, 2021 for International Application No. PCT/CN2021/107123, 9 pages.

* cited by examiner

TAMPER-RESISTANT CIRCUIT, BACK-END OF THE LINE MEMORY AND PHYSICAL UNCLONABLE FUNCTION FOR SUPPLY CHAIN PROTECTION

CROSS-REFERENCE TO RELATED APPLICATION

This application is related to U.S. patent application Ser. No. 16/933,509 entitled "TAMPER RESISTANT OBFUSCATION CIRCUIT" filed concurrently herewith, which is hereby incorporated.

BACKGROUND OF THE INVENTION

Field of the Invention

The present invention generally relates to integrated circuits, and more particularly to a tamper-resistant integrated circuit having a nonvolatile memory for containing secret information such as a trusted function or an encryption key.

Description of the Related Art

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there can be many distinct layers of conducting media available for routing, such as a polysilicon layer and multiple metal layers (metal-1, metal-2, etc.).

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a "dataprep" process that is used to produce patterns called masks by an optical or electron beam pattern generator. During fabrication, these masks are used to etch or deposit features in a silicon wafer in a sequence of photolithographic steps.

As humans become more reliant on electronic systems and autonomous machines that use integrated circuits, there is a growing concern about the hardware security of these devices. Chip designers are increasingly trying to maintain the secrecy of proprietary designs for integrated circuits. There is also a desire to prevent substitution of rogue parts in more complex systems. A variety of approaches have been devised to address these concerns, particularly by enabling "trusted" chips and circuit boards. For example, a trusted platform module (TPM) is an international standard for a cryptoprocessor dedicated to securing hardware through integrated cryptographic keys. A TPM can create a nearly unforgeable hash key summary of the hardware and software configuration. This allows a third party to verify that the software has not been changed.

Security measures can also involve a physical unclonable function. A physical unclonable function (PUF) is a device that exploits inherent randomness introduced during manufacturing to give a physical entity a unique "fingerprint" or trust anchor. A PUF can be used to provide a unique, unpredictable identification number for each chip that is generated during manufacturing.

Another approach to protecting circuits is obfuscation circuitry. Obfuscation circuitry modifies the structure of an integrated circuit to intentionally conceal its functionality. One way this modification can occur is by splitting up manufacture of the IC chip into two parts, one "trusted" and one "untrusted". An untrusted chip or base fabricated front-end of the line (FEOL) forms the core of the chip functionality, while portions of the wiring for the logic are manufactured in a trusted facility as back-end of the line (BEOL). In this manner, the chip proprietor can maintain secrecy of the details of hidden wires.

In addition to these approaches, physical security can be provided by various manners of tamper-resistant packaging. Packaging can be designed to electronically detect when possible tampering is occurring, and take some action such as generating an alarm and deleting cryptographic keys or zeroing them out (zeroisation). Some hardware allows for cold zeroisation, the ability to zeroise without the normal system power supply being enabled. Custom-made encapsulation methods used for chips employed in some cryptographic products are designed in such a manner that the chips are internally pre-stressed, so they will physically fracture if interfered with. One example of a secure cryptoprocessor with tamper-proof packaging is the IBM® 4758 cryptographic coprocessor sold by International Business Machines Corporation.

SUMMARY OF THE INVENTION

The present invention is generally directed to an integrated circuit comprising a substrate having a plurality of logic cells forming operative circuitry, a plurality of metal wiring layers located above the substrate which provide wiring for the operative circuitry wherein the metal wiring layers include a first metal wiring layer which is above a second metal wiring layer, and a memory array of solid-state nonvolatile memory cells located between the first metal wiring layer and the second metal wiring layer, the first metal wiring layer and the second metal wiring layer having metal portions which together form a metal mesh that at least partially surrounds the memory array. In one embodiment, the substrate includes measurement circuits for the solid-state nonvolatile memory cells, a given one of the solid-state nonvolatile memory cells is connected to a corresponding one of the measurement circuits through a vertical stack of interconnecting metal portions at multiple metal wiring layers, and a footprint of a given one of the interconnecting metal portions in a particular metal wiring layer is no smaller than a footprint of a next interconnecting metal portion in a next lower metal wiring layer below the particular metal wiring layer. The memory array is preferably fabricated in a back-end of the line process so the fabrication can be performed at a trusted foundry. In an illustrative implementation each measurement circuit has a differential sense amplifier which provides a constant current flow for memory cell measurement to prevent picosecond imaging circuit analysis of the solid-state nonvolatile memory cells. The substrate, metal layers and memory array can advantageously be constructed as part of a single monolithic structure. In an embodiment that is adapted for a chip identification protocol, the memory array contains a physical unclonable function identifier that uniquely identifies the tamper-resistant integrated circuit, an encryption key and a release key.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
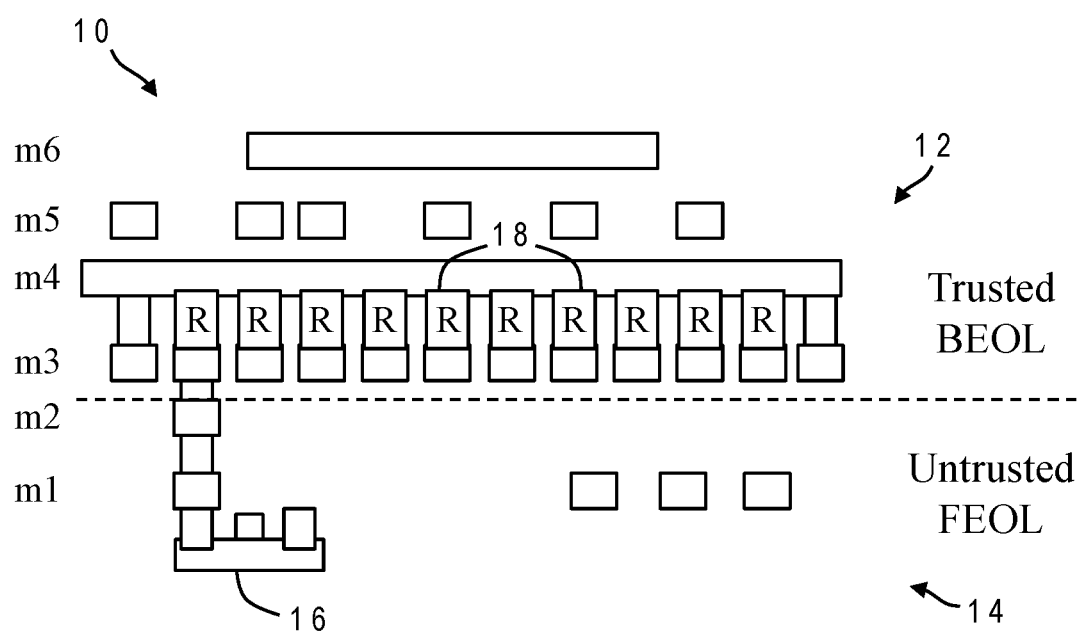
FIG. 1 is an elevational cross-section of an integrated circuit showing a tamper-resistant nonvolatile memory and various metal wiring layers in accordance with one implementation of the present invention.

Approaches like tamper-resistant circuits, obfuscation and physical unclonable functions have gone a long way to protect chip and board supply chains for the most vitals systems like networking, trucks, ships, energy production, etc., and are also very useful at preventing the introduction of rogue chips and boards. However, all of these approaches require secret or hidden data such as the PUF identification number or an encryption key, and this data must remain secret for the protection to work. Storing digital information like a secret key in a device that is resistant to physical attack is challenging. Current solid-state memory can be read non-invasively or invasively with some effort using techniques such as picosecond imaging circuit analysis (PICA) and delayering with measurement. Conventional memory technologies like electrically-programmable read-only memory (EPROM), static random-access memory (SRAM), dynamic random-access memory (DRAM), flash memory and electrically programmable fuse memory (eFuse) are all vulnerable to these techniques. Other methods like spying on current consumption (side channel attack) while exercising the memory can allow a bad actor to infer the memory state. Additionally, tamper-resistant packaging such as that found in the IBM® 4758 cryptographic coprocessor is too expensive to be feasible for the majority of supply chain concerns. Those packaging solutions also cannot be integrated monolithically with silicon technology.

It would, therefore, be desirable to devise an improved tamper-resistant memory for supply chain protection. It would be further advantageous if the tamper-resistant memory could be monolithically integrated with other circuits like a microprocessor. These and other advantages are achieved in various implementations of the present invention by providing a tamper-resistant memory as part of the back-end of the line (BEOL) chip fabrication which uses an array of solid-state memory cells at least partially surrounded by a metal mesh formed from the metal wiring layers of the integrated circuit chip. In the preferred embodiment the memory is resistive random-access memory (ReRAM). The mesh pitch provides a spacing which is less than infrared camera wavelengths to PICA reads of the memory. Delayering and electrical measurement can be prevented by providing an area of metal in the metal layer n+1 above the memory array that is greater than or equal to the area of metal in the metal layer n below the memory array and ensuring that none of the metal in the lower level extends beyond the edges of the upper level area. The read/write circuits for the cells can also be placed below these memory metal layers again without extending beyond the edges of the lowest memory metal layer. Electrical side channel attacks as well as PICA reads can be further impeded by using differential circuits to read the memory values. By providing this improved protection structure as well as fabrication and programming of the memory in a trusted facility, the secrets stored therein remain undiscoverable by current reverse-engineering technologies.

With reference now to the figures, and in particular with reference to FIG. 1, there is depicted one embodiment 10 of a tamper-resistant integrated circuit constructed in accordance with the present invention. Tamper-resistant integrated circuit 10 includes a trusted portion (BEOL) 12 and an untrusted portion (FEOL) 14. Trusted portion 12 may be fabricated separately from untrusted portion 14 and the two parts subsequently attached, or trusted portion 12 may be fabricated on top of untrusted portion 14 such that integrated circuit 10 has a monolithic (unitary) design. Each circuit portion has wiring at various horizontal metal layers m1-m6, with layers m1-m2 being FEOL and layers m3-m6 being BEOL. Logic cells are formed on a semiconductor substrate 16 (e.g., silicon) to form the core operative circuitry of integrated circuit 90 according to the particular design at hand. Integrated circuit 90 may have other layers not called out, e.g., a polysilicon layer. Vias provide vertical connections between adjacent horizontal layers and the logic cells in silicon layer 16. According to this embodiment, untrusted portion 14 is fabricated by an untrusted foundry, while trusted portion 12 is fabricated by an trusted foundry.

Trusted portion 12 includes an array of solid-state nonvolatile memory cells 18 located between metal layers m4 and m5. In this cross-section not all connections in the metal layers are shown for all of the memory cells. Also, some of the depicted metal wiring, such as the wiring in layers m5 and m6, is used by other unrelated circuits, e.g., power or signals. While only one row of memory cells is shown, it is understood that there can be many rows of cells arranged side-by-side in the array. In some implementations of the present invention and as explained further below, memory cells 18 can contain one or more keys such as PUF keys, encryption keys, and release keys. Memory cells 18 are preferably resistive random-access memory (ReRAM) but other memory types may be used, e.g., magnetoresistive random-access memory (MRAM), phase-change memory (PCM), or conductive-bridging random-access memory (CBRAM). The metal in layer m4 overlaps the memory array, and the interconnecting portions of metal in layer m3 similarly overlap the memory array. In this manner, the two metal wiring layers form a protective mesh to at least partially surround the array, thereby creating a tamper-resistant memory. In the illustrative implementation, the mesh completely surrounds the array on top and bottom.

Figure 2:
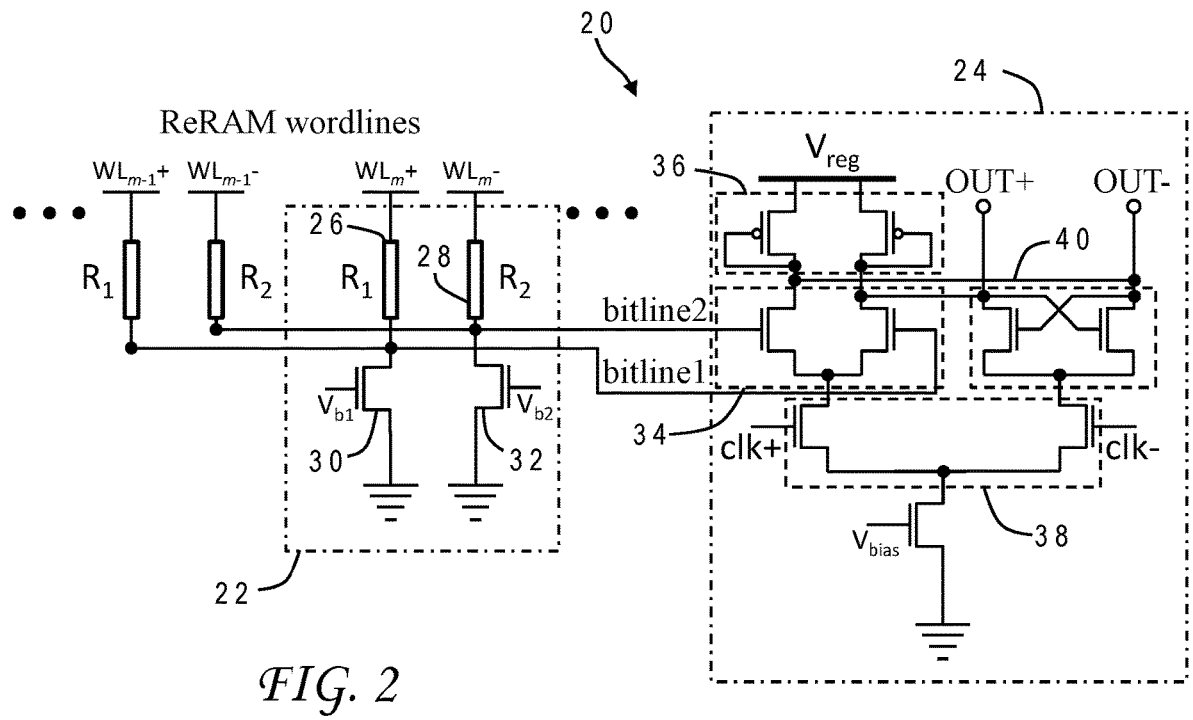
FIG. 2 is a schematic diagram of a memory read circuit using a current mode logic latch for use with reading memory cells of the tamper-resistant nonvolatile memory of FIG. 1 in accordance with one implementation of the present invention.

In some embodiments, read circuitry for the tamper-resistant memory uses differential amplifiers to make the memory both PICA read resistant and side channel tamper resistant. FIG. 2 shows one implementation for such a differential ReRAM measurement circuit 20 suitable for use with the tamper-resistant memory of the present invention. Differential ReRAM measurement circuit 20 includes a front-end circuit 22 and a current mode logic (CML) latch circuit 24. Front-end circuit 22 generates two bitlines (bitline1 and bitline2) from a wordline of a ReRAM cell m, and CML latch circuit 24 takes the bitlines and generates complementary output signals (OUT+ and OUT−). CML latch circuit 24 is particularly useful in transforming a very small voltage difference (e.g., a few millivolts) into logic 0 or 1 values using higher system (chip) voltage levels.

The wordline $WL_m+$ from the memory cell is connected to a first resistor 26 (R1) and the complement of the wordline $WL_m-$ is connected to a second resistor 28 (R2). Resistors 26, 28 are in turn respectively connected to the drains of two foot transistors 30, 32. The sources of foot transistors 30, 32 are connected to system ground. The gate of each foot transistor 30, 32 is controlled by a respective bias voltage $V_{b1}$, $V_{b2}$. The bias voltages can be selected based on the particular specifications of the ReRAM cells, and can be the same voltage. Resistors 26, 28 thereby generate a voltage differential $\delta V_m$ between bitline1 and bitline2 that is amplified and latched by CML latch circuit 24. If the ReRAM cell holds a logic "1" value at its local voltage level, the voltage differential ΔV is relatively high and the value of output signal OUT+ will be logic "1" (system high voltage) while the value of output signal OUT− will be logic "0". Conversely, if the ReRAM cell holds a logic "0" value (zero voltage), the voltage differential ΔV is low or zero and the value of output signal OUT+ will be logic "0" while the value of output signal OUT− will be logic "1".

FIG. 2 shows how the same latch circuit can be used to read other memory cells in a memory array, e.g., cell m-1, which is selected by activating a different wordline. Non-selected wordlines are left open, therefore only the $\delta V_m$ from the selected wordline m is read. The other wordline resistors just add a slight parasitic capacitance that does not affect the read operation.

Figure 3:
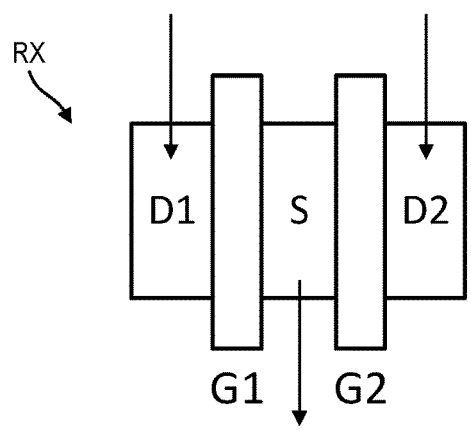
FIG. 3 is a pictorial representation of an active silicon area for certain transistor pairs of the memory read circuit of FIG. 2 in accordance with one implementation of the present invention.

In the preferred embodiment, foot transistors 30, 32 together form a differential circuit that is implemented with two field-effect transistors (FETs) in a common active (conducting) area of the silicon substrate, for PICA read resistance. FIG. 3 shows a pictorial representation of such a differential circuit in an active silicon island RX. The voltage from resistor 26 is applied to a first drain region D1 of foot transistor 30, and the voltage from resistor 28 is applied to a second drain region D2 of foot transistor 32. Drains D1 and D2 are part of the same diffusion for a double gate design with a common source region S. If the voltage at gate G1 is greater than a threshold voltage and the voltage at gate G2 is less than the threshold voltage then current flows from drain region D1 to source region S. If the voltage at gate G2 is greater than the threshold voltage and the voltage at gate G1 is less than the threshold voltage then current flows from drain region D2 to source region S. Current stays constant through active region RX so constant PICA emission and switching state and activity cannot be detected. The RX area conducts heat well so it is not possible for a PICA read to discern whether the output current of the differential circuit comes from the + or − branch. Power usage also stays constant so switching state and activity cannot be detected trough thermal/acoustic measurements.

The differential circuit design of region RX as seen in FIG. 3 may also be applied to other transistor pairs in CML latch circuit 24, as indicated by the dashed boxes, for an input transistor pair 34, a clock gating transistor pair 36, a voltage regulator transistor pair 38, and an output transistor pair 40. In this manner PICA reads of the latch circuit are likewise ineffective.

Figure 4:
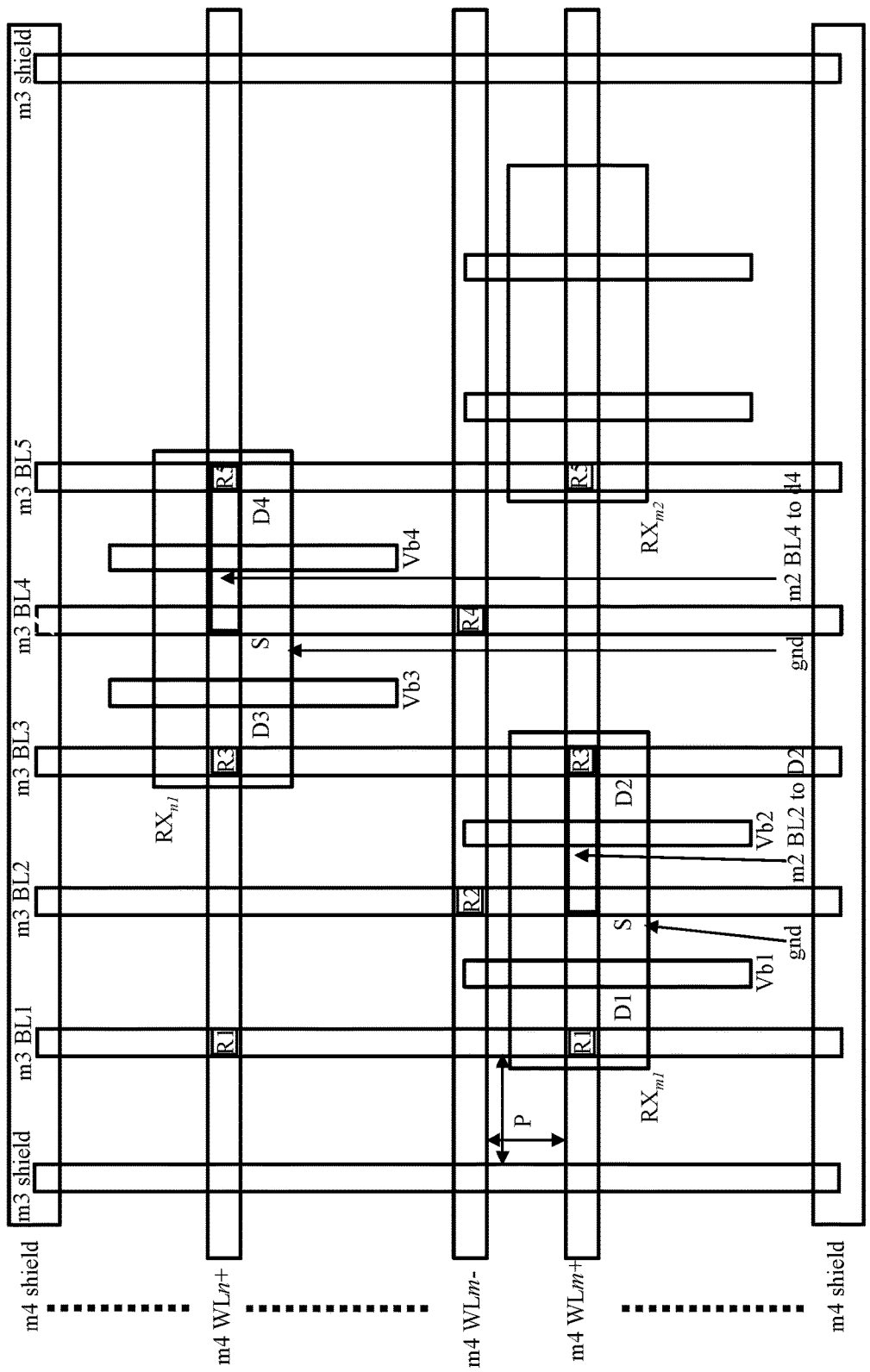
FIG. 4 is a plan view of a tamper-resistant nonvolatile memory in accordance with one implementation of the present invention showing certain metal wiring layers for wordline and bitlines and active silicon areas for differential amplifiers.

FIG. 4 shows a plan view of how the metal layers m2, m3 and m3 can be arranged for the implementation with a differential amplifier in a single RX island. There are five m4 horizontal strips shown in FIG. 4 extending across the design from left to right, the uppermost and lowermost strips "m4 shield" providing shielding of the memory array. There are seven m3 vertical strips shown in FIG. 4 extending across the design from top to bottom, the leftmost and rightmost strips "m3 shield" similarly providing shielding of the memory array. A pair of wordlines WLm+ and WLm− in the m4 layer form a differential wordline used to read an active region $RX_{m1}$ for memory cell m. Only one differential wordline of the memory array is activated at a time, and all bits along that wordline from other memory cells (one of which is depicted as $RX_{m2}$) can be simultaneously read. A pair of bitlines BL1 and BL2 in the m3 layer are used to read the value of memory cell m. The pitch P of for the wordlines and bitlines preferably provides a spacing which is less than infrared camera wavelengths, or about 1.3 micrometers, so as to prevent picosecond imaging circuit analysis (PICA read) of the memory. In an alternative embodiment the spacing is even smaller to effectively build a Faraday cage around the memory. Generally a hole in a Faraday cage must be less than around ¹⁄₁₀th the detector wavelength, so for such an embodiment the metal spacing would be less than about 0.13 micrometers. This construction additionally protects the memory array against side channel attacks as well as delayering and measurement. In implementation of FIG. 4 a given differential amplifier RX is larger than the metal pitch P so differential amplifiers are interleaved to read all of the differential Rn/Rn+1 bits. The differential amplifiers can be placed in the middle of the memory array to reduce bitline resistance. In order to keep the presentation of FIG. 4 manageable, other metal layer features such as the latches, ground connections, and bias voltages are not shown. It is likewise understood that the drawing of FIG. 4 is not to scale.

Figure 5:
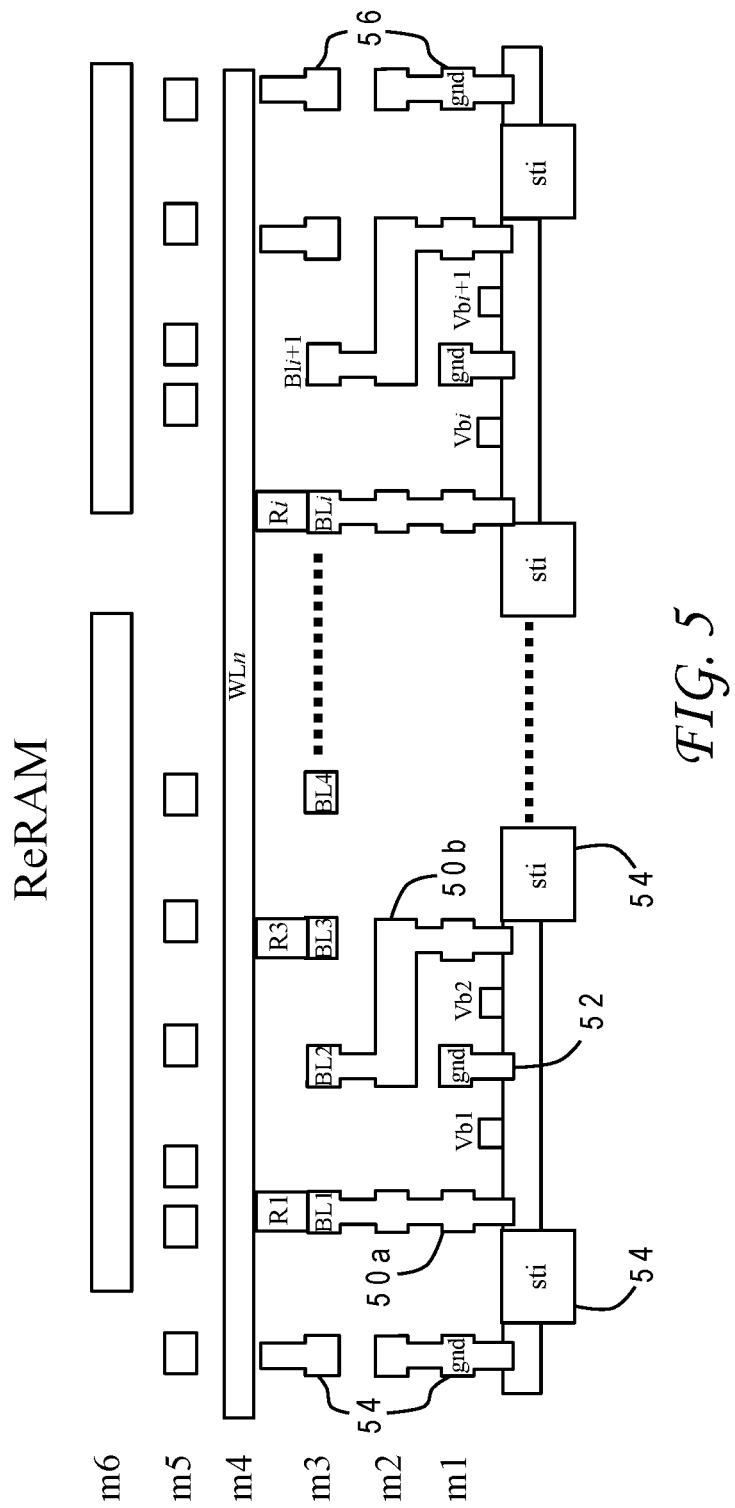
FIG. 5 is an elevational cross-section of an integrated circuit showing bitline wiring for a tamper-resistant nonvolatile memory in accordance with one implementation of the present invention.

A given memory cell is connected to its read/write circuitry in the silicon substrate 16 through vertical interconnections with multiple metal layers, in this example, layers m1, m2 and m3. Each metal layer in an interconnection can be designed so that it protects the layer below, i.e., its footprint is larger than (or at least equal to) the footprint of the next lower layer below each cell. This construction increases resistance to delayering and voltage probing. The read/write circuits for each memory cell can also be placed below the footprint of the metal layer (in this case m4) forming the shroud over the tamper-resistant memory and below the interconnecting portions of metal layer m4. FIG. 5 illustrates how the lower metal layers can be so constructed for the bitline wiring of a memory cell. In this embodiment, the first bitline 50a for memory cell R1 is a single vertical stack, and the second bitline 50b for the same memory cell R1 is staggered across two adjacent vertical stacks to achieve the differential circuit arrangement described above. Each metal layer in the vertical stack for bitline 50a thus protects the foregoing layer. For bitline 50b, an extra metal portion 52 connected to system ground is provided in metal layer m1 directly below the bitline connection to the memory cell to protect the initial portion of that bitline. Shallow deep trench isolation (STI) blocks 54 can be used to prevent leakage current between adjacent devices. Bitlines for other memory cells in the memory array are similarly spread out as indicated by bitlines BLi and BLi+1 for memory cell Ri.

In addition to the side shielding of the memory array provided by the m3 layer ("m3 shield" in FIG. 4) additional side shielding may be provided by the m1 and m2 layers as indicated at 54, 56 to protect the bitlines as well.

The descriptions herein may refer to terms such as above/below, upper/lower, and horizontal/vertical as they are convenient and in accord with the views of the embodiments as presented in the figures. These terms are also typically used in describing integrated circuit structures in this manner, e.g., horizontal metal layers. Those skilled in the art will appreciate, however, that these terms are relative and different orientations or perspectives may lead to other term usages which are equivalent.

As noted above, the tamper-resistant memory of integrated circuit 10 can be used to hold various secrets including one or more keys such as encryption keys and release keys as well as PUF identification numbers or serial numbers. One implementation where all of these types of secrets are used for chip identification and activation is described with reference to FIGS. 5-7. Those skilled in the art will appreciate, however, that a wide-variety of secrets can be stored in the tamper-resistant memory for other purposes. For instance, the tamper-resistant memory is very useful for encoding obfuscation functions, such as a Boolean function. Additional details of a tamper-resistant memory with a trusted Boolean obfuscation function are described in copending U.S. patent application Ser. No. 16/933,509 entitled "TAMPER RESISTANT OBFUSCATION CIRCUIT" filed concurrently herewith, which is hereby incorporated.

The encryption key, release key and PUF ID features may be further understood with reference to the chart of FIG. 5 which illustrates the logical flow for a trusted manufacturing, chip identification and encryption process 100 in accordance with one implementation of the present invention.

Process 100 may be broken down into two sets of steps 102, 104. Steps 102 are carried out by an untrusted foundry, while steps 104 are carried out by a trusted foundry. Process 100 begins with the untrusted foundry setting up the chip manufacturing 106, based on the particular layouts provided. Non-trusted manufacturing 108 is then performed for front-end of line logic and metal layers. At this point the process is handed off to the trusted foundry, which carries out trusted manufacturing 110 for the remaining back-end of line including the tamper-resistant memory. Any final steps such as packaging are carried out for chip manufacturing completion 112. An encryption key is written to the tamper-resistant memory 114. Tamper-resistant chip 10 includes appropriate pins to allow the memory cells to be programmed. A release key is also written to the tamper-resistant memory 116. The PUF identifier for the chip is synthesized and loaded in the tamper-resistant memory 118. The chip is now ready for deployment.

Figure 6:
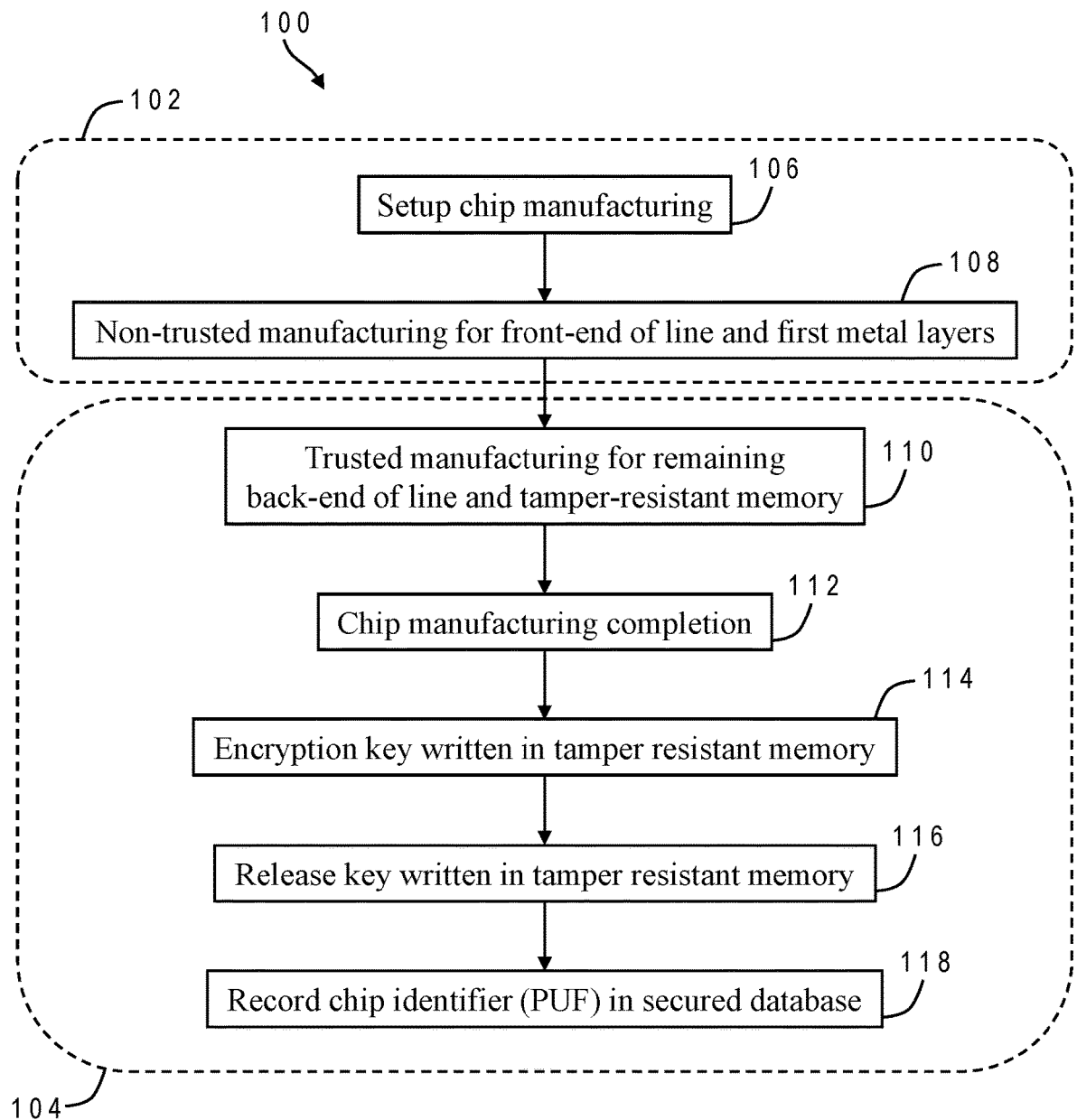
FIG. 6 is a chart illustrating the logical flow for a trusted manufacturing, chip obfuscation and encryption process in accordance with one implementation of the present invention.

The inclusion of all three of the release key, the encryption key and the PUF identifier in the tamper-resistant memory provides significant advantages in identifying chips already deployed. Techniques such as challenge/response of a chip can be exhaustively searched by a bad actor and therefore are not a secure solution. FIG. 6 shows an example 120 of how chip identification in the field can be accomplished using symmetrical encryption. A server or other computer system 122 is used to manage identification and release functions for a plurality of chips 124 (chips 1 through m). Server 122 is preferably a cloud server, operating in a cloud environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Returning to FIG. 6, chips 124 are assembled into one or more devices having communications hardware that allows the chips to communicate with external networks. Cloud server 122 can thereby communicate with chips 124 via a network 126 such as the Internet. Each chip has a PUF key IC.i, a release key, and an encryption key loaded in the tamper-resistant memory of the chip. Each PUF key is used to uniquely identify its respective chip, and the release key is used to authorize release of the PUF identifier. Cloud server 122 can access a chip identification database 128 which contains all of the PUF keys, the release key and the encryption key which is symmetric with the encryption key in the chips. When identification of a particular chip is desired, cloud server 122 transmits an identification request to the chip according to one or more secure protocols. The chip can then send its PUF key back to cloud server 122 which can verify the PUF key to identify the specific chip.

Figure 7:
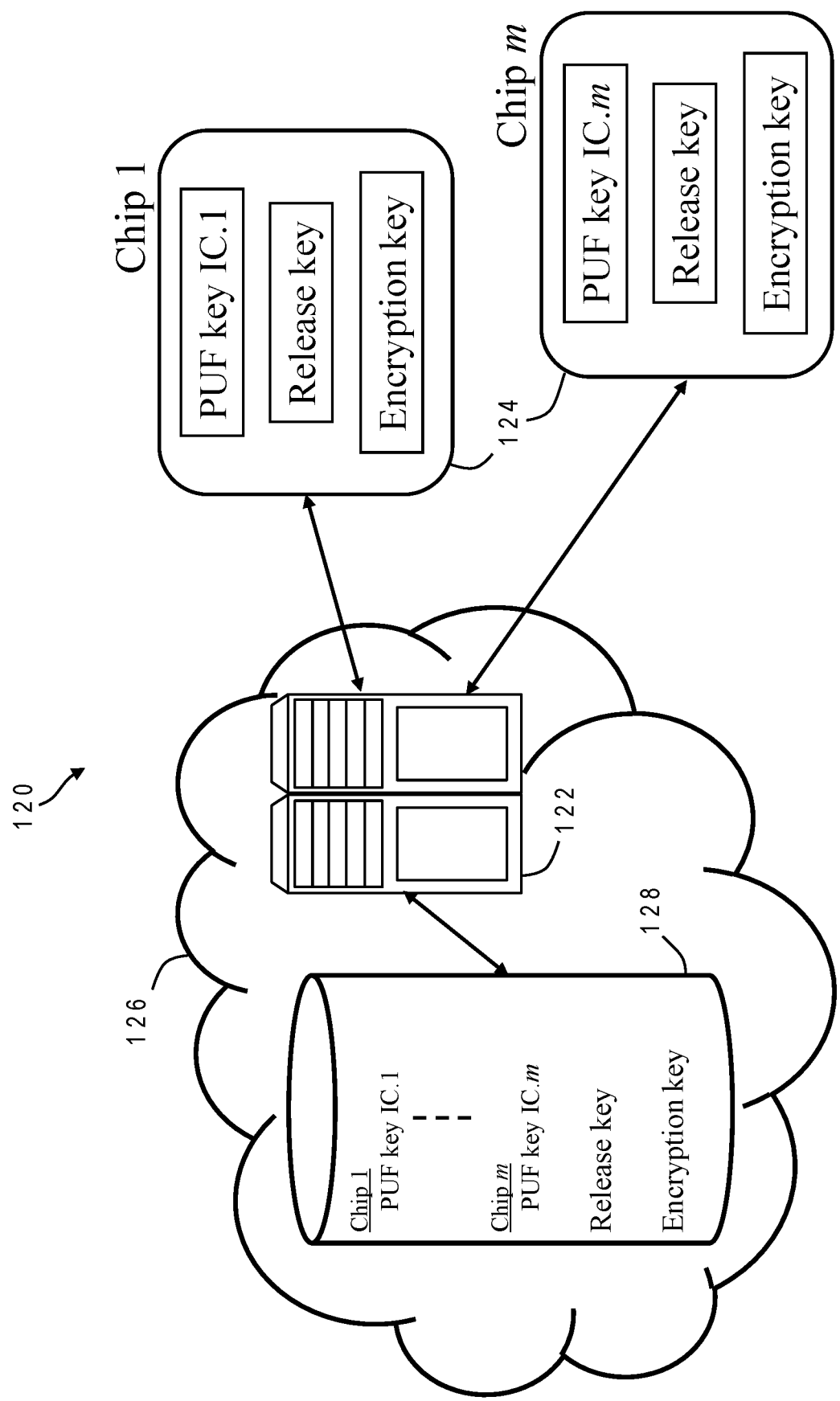
FIG. 7 is a pictorial representation of chip identification in the field using symmetrical encryption in accordance with one implementation of the present invention.
Figure 8:
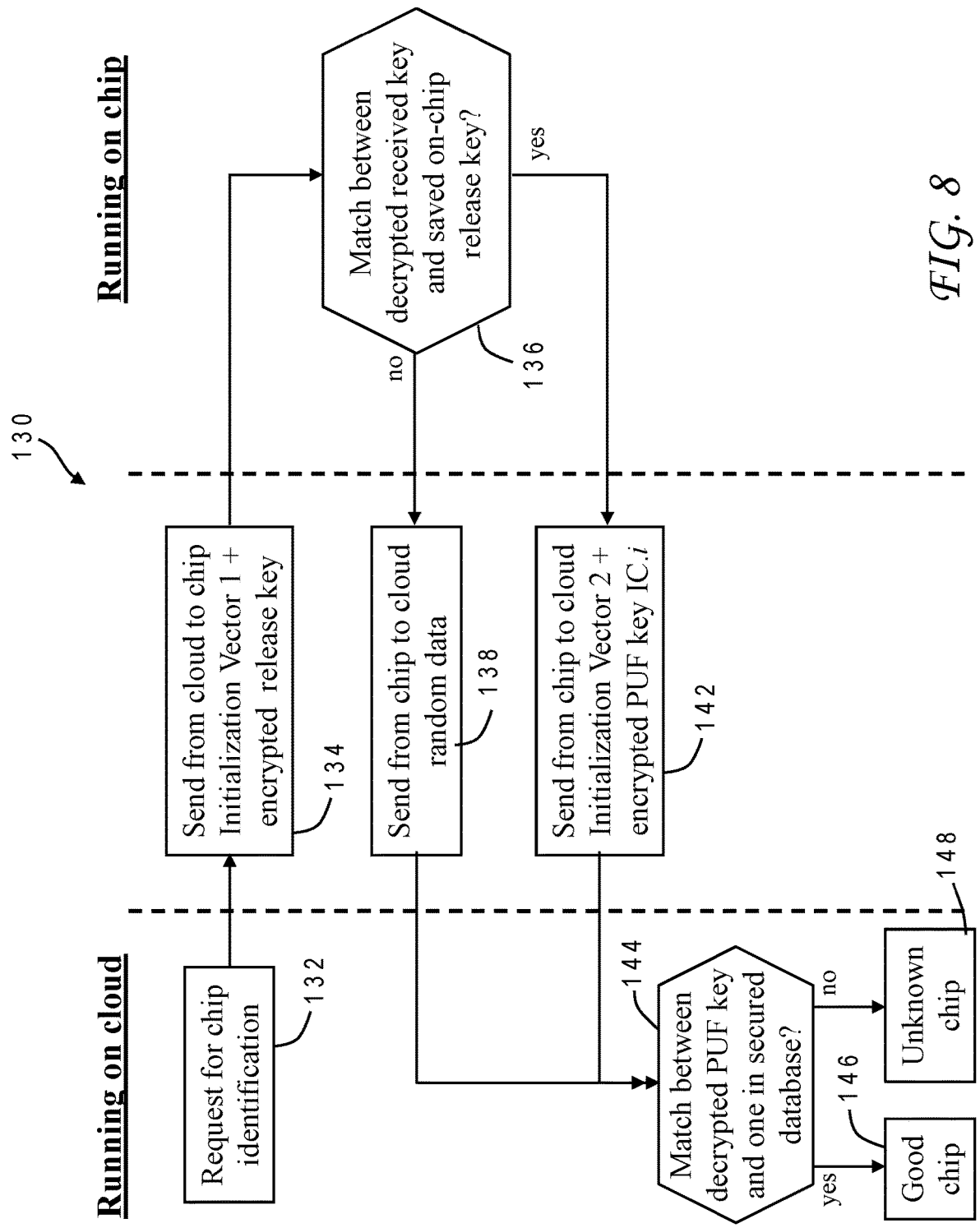
FIG. 8 is a chart depicting the logical flow for a chip identification protocol using symmetrical encryption in accordance with one implementation of the present invention.

A number of different protocols may be used to confirm chip identification. The protocol is preferably adapted to prevent man-in-the-middle attacks as well as any chip or cloud misrepresentation. The protocol can also advantageously be designed to be secure even if the communications link is not secure or if the chip or local device is untrusted. One suitable protocol 130 is seen in FIG. 7, using symmetrical encryption according to an illustrative implementation. Protocol 130 begins when the cloud server receives a request for chip identification 132. The cloud server sends a transmission to the chip 134 with a first initialization vector and the release key that has been encrypted using the encryption key based on the initialization vector. Here, initialization vectors are generated randomly and are used to generate different encrypted transmissions even when the same data is sent, preventing man-in-the-middle attacks. When the chip receives this transmission, it decrypts the release key and compares it to the corresponding release key currently stored in the tamper-resistant memory 136. If the two keys do not match, random data are sent 138 to prevent the PUF key from being disclosed to an unknown party. A rogue chip cannot be used to discern the release key since it is encrypted.

If the two release keys do match, the chip confirms the chip identification by sending a response transmission 142 to the cloud server with a second initialization vector and its PUF key that has been encrypted using the encryption key based on the initialization vector. The cloud server decrypts the transmission 144 to determine if the decrypted PUF key matches any of the PUF identifiers in the database. If so, the chip is considered good 146 and the system it is a part of can be considered trusted. If the decrypted PUF key does not match any in the database (which will be the result from any random data in transmission 138), the chip is marked as unknown 148, i.e., untrusted. The result can be provided to a system supervisor. Protocol 130 is effective even if the communications channel is untrusted and the end device containing the chip that needs to be programed is untrusted.

The present invention in its manifold embodiments thereby provides a superior solution to supply chain protection, by establishing a reliable way to identify trusted chips. This methodology prevents the insertion of rogue chips in a system. Circuit boards can also be protected by inserting an identifying chip on a board and thereby marking it as a good board, preventing the insertion of rogue boards in a system. Owing to its small volume, the tamper-resistant chip can also be inserted in any object that needs to be identified, and can be identified via wirelessly or wired contact. The tamper-resistant memory can be used to store additional information such as block chain records pertaining to the supply chain for a product, allowing all transactions along the supply chain to be stored within a chip.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. An integrated circuit comprising:
a substrate having a plurality of logic cells forming operative circuitry;

a plurality of metal wiring layers located above said substrate at least some of which provide wiring for said operative circuitry, said metal wiring layers including a first metal wiring layer which is above a second metal wiring layer; and a memory array of solid-state nonvolatile memory cells located between said first metal wiring layer and said second metal wiring layer, said first metal wiring layer and said second metal wiring layer having metal portions which together form a metal mesh that at least partially surrounds said memory array.

2. The integrated circuit of claim 1 wherein said metal mesh has a spacing no greater than 1.3 micrometers.

3. The integrated circuit of claim 1 wherein:
said substrate includes measurement circuits for said solid-state nonvolatile memory cells;
a given one of said solid-state nonvolatile memory cells is connected to a corresponding one of said measurement circuits through one or more vertical stacks of interconnecting metal portions at multiple metal wiring layers; and
a footprint of a given one of said interconnecting metal portions in a particular metal wiring layer is no smaller than a footprint of a next metal portion in a next lower metal wiring layer directly below said particular metal wiring layer.

4. The integrated circuit of claim 3 wherein said measurement circuits are shrouded by said metal mesh and metal portions in additional metal wiring layers are provided along sides of the memory array to shield said measurement circuits.

5. The integrated circuit of claim 1 wherein said memory array is fabricated in a back-end of the line process.

6. The integrated circuit of claim 1 wherein said substrate includes measurement circuits for said solid-state nonvolatile memory cells, each measurement circuit having a differential sense amplifier which provides a constant current flow for memory cell measurement to prevent picosecond imaging circuit analysis of said solid-state nonvolatile memory cells.

7. The integrated circuit of claim 1 wherein said substrate, said plurality of metal wiring layers and said memory array are part of a single monolithic structure.

8. The integrated circuit of claim 1 wherein said solid-state nonvolatile memory cells are resistive random-access memory.

9. The integrated circuit of claim 1 wherein said memory array contains a physical unclonable function identifier that uniquely identifies the tamper-resistant integrated circuit.

10. The integrated circuit of claim 9 wherein said memory array further contains an encryption key and a release key.

11. A tamper-resistant integrated circuit comprising:
a substrate having a plurality of logic cells forming operative circuitry;
a plurality of metal wiring layers located above said substrate at least some of which provide wiring for said operative circuitry, said metal wiring layers including a first metal wiring layer which is immediately above a second metal wiring layer; and
a memory array of solid-state nonvolatile memory cells fabricated in a back-end of the line process and located between said first metal wiring layer and said second metal wiring layer, said first metal wiring layer and said second metal wiring layer having metal portions which together form a metal mesh having a spacing no greater than 1.3 micrometers that surrounds said memory array, wherein said substrate, said plurality of metal wiring layers and said memory array are part of a single monolithic structure, and said substrate includes measurement circuits for said solid-state nonvolatile memory cells, each measurement circuit having a differential sense amplifier which provides a constant current flow for memory cell measurement to prevent picosecond imaging circuit analysis of said solid-state nonvolatile memory cells.

12. The tamper-resistant integrated circuit of claim 11 wherein:
a given one of said solid-state nonvolatile memory cells is connected to a corresponding one of said measurement circuits through one or more vertical stacks of interconnecting metal portions at multiple metal wiring layers; and
a footprint of a given one of said interconnecting metal portions in a particular metal wiring layer is no smaller than a footprint of a next metal portion in a next lower metal wiring layer directly below said particular metal wiring layer.

13. The tamper-resistant integrated circuit of claim 12 wherein said measurement circuits are shrouded by said metal mesh and metal portions in additional metal wiring layers are provided along sides of the memory array to shield said measurement circuits.

14. The tamper-resistant integrated circuit of claim 13 wherein said memory array contains a physical unclonable function identifier that uniquely identifies the tamper-resistant integrated circuit, an encryption key and a release key.

15. A method of confirming identification of an integrated circuit chip comprising:
receiving a request for chip identification at the integrated circuit chip from a chip identification system, wherein the integrated circuit chip has a tamper-resistant memory containing a physical unclonable function identifier that uniquely identifies the integrated circuit chip, an unencrypted release key, and an encryption key, and the request includes an encrypted release key;
decrypting the encrypted release key using the encryption key to generate a decrypted release key;
determining that the decrypted release key matches the unencrypted release key; and
responsive to said determining, encrypting the physical unclonable function identifier using the encryption key and transmitting a response to the chip identification system, wherein the response includes the encrypted physical unclonable function identifier.

16. The method of claim 15 wherein the request further includes an initialization vector for use with the encryption key to decrypt the encrypted release key.

17. The method of claim 16 wherein the encryption key is a first symmetric encryption key, the initialization vector is a first initialization vector, and the response further includes a second initialization vector for use with a second symmetric encryption key corresponding to the first symmetric encryption key to decrypt the encrypted physical unclonable function identifier.

18. The method of claim 15 wherein the tamper-resistant memory is fabricated in a back-end of the line process.

19. The method of claim 15 wherein the encryption key is a symmetric encryption key.

20. The method of claim 15 wherein the encrypted physical unclonable function identifier is transmitted to the chip identification system over a network.

* * * * *